United States Patent [19]
Greene

[11] Patent Number: 4,529,341
[45] Date of Patent: Jul. 16, 1985

[54] DRILL BIT FOR KEVLAR LAMINATES

[75] Inventor: Eddie A. Greene, Hawthorne, Calif.

[73] Assignee: Hughes Helicopters, Inc., Culver City, Calif.

[21] Appl. No.: 427,658

[22] Filed: Sep. 29, 1982

[51] Int. Cl.³ .............................................. B23B 51/00
[52] U.S. Cl. .................................... 408/212; 408/211; 408/230
[58] Field of Search ........................... 29/56.5; 51/288; 408/211, 212, 213, 230, 715, 199

[56] References Cited

U.S. PATENT DOCUMENTS

| | | | |
|---|---|---|---|
| 228,421 | 6/1880 | Thuston | 408/211 |
| 2,600,286 | 6/1952 | Weiland | 408/211 |
| 2,613,710 | 10/1952 | Emmons | 408/213 |
| 4,209,275 | 6/1980 | Kim | 408/211 |
| 4,285,620 | 8/1981 | Luebbert et al. | 408/212 |
| 4,330,229 | 5/1982 | Croydon | 408/212 |

FOREIGN PATENT DOCUMENTS

| | | | |
|---|---|---|---|
| 944587 | 4/1949 | France | 408/212 |
| 132908 | 8/1982 | Japan | 408/199 |

OTHER PUBLICATIONS

"Cutting Holes in Fabric-Faced Panels"; Peterson; NASA Tech Brief, p. 391, Fall 1980.

Primary Examiner—William R. Briggs
Attorney, Agent, or Firm—Beehler, Pavitt, Siegemund, Jagger & Martella

[57] ABSTRACT

An improved drill bit for drilling Kevlar laminates or the like, has a pair of helical edges each terminating in an outer cutting point; a center point; and concavely curved cutting edges extending between the center point and each of the outer cutting point. The cutting edges curve back sharply from the cutting points in a plane transverse to the longitudinal drill bit axis and in a direction opposite to normal rotation of said drill bit so as to draw material served by the cutting points radially inwardly from the edge of a bore. A method is disclosed for modifying a conventional drill point to the novel configuration by grinding on a grinding wheel.

9 Claims, 12 Drawing Figures

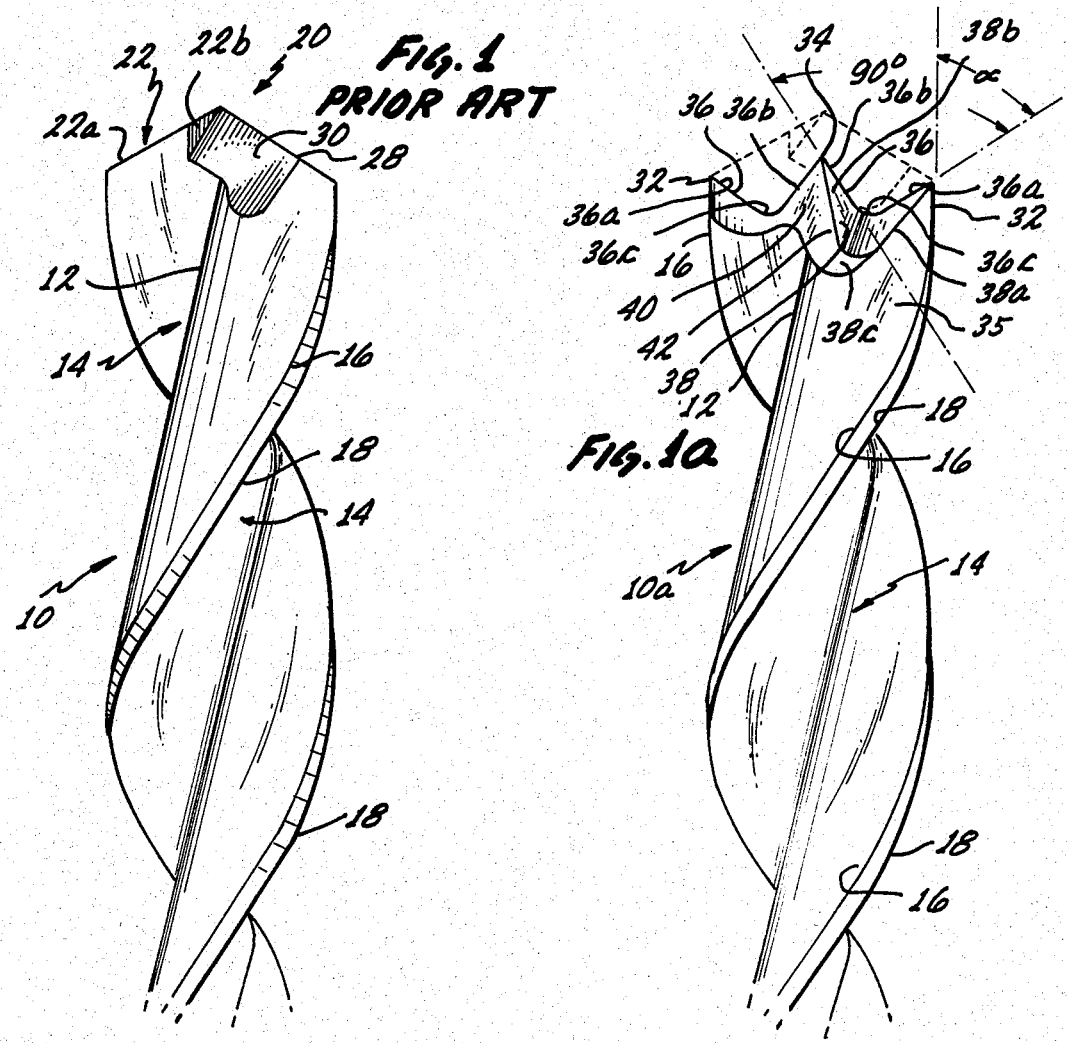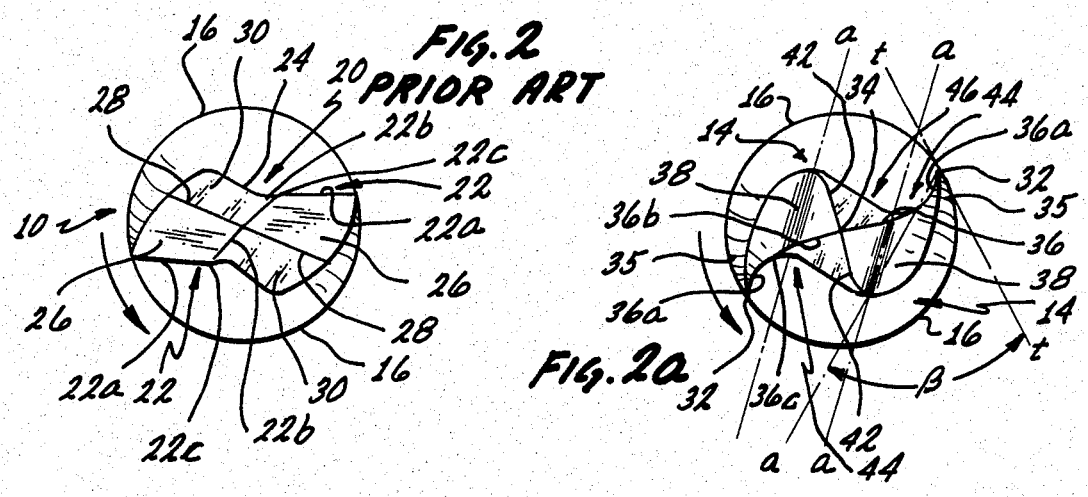

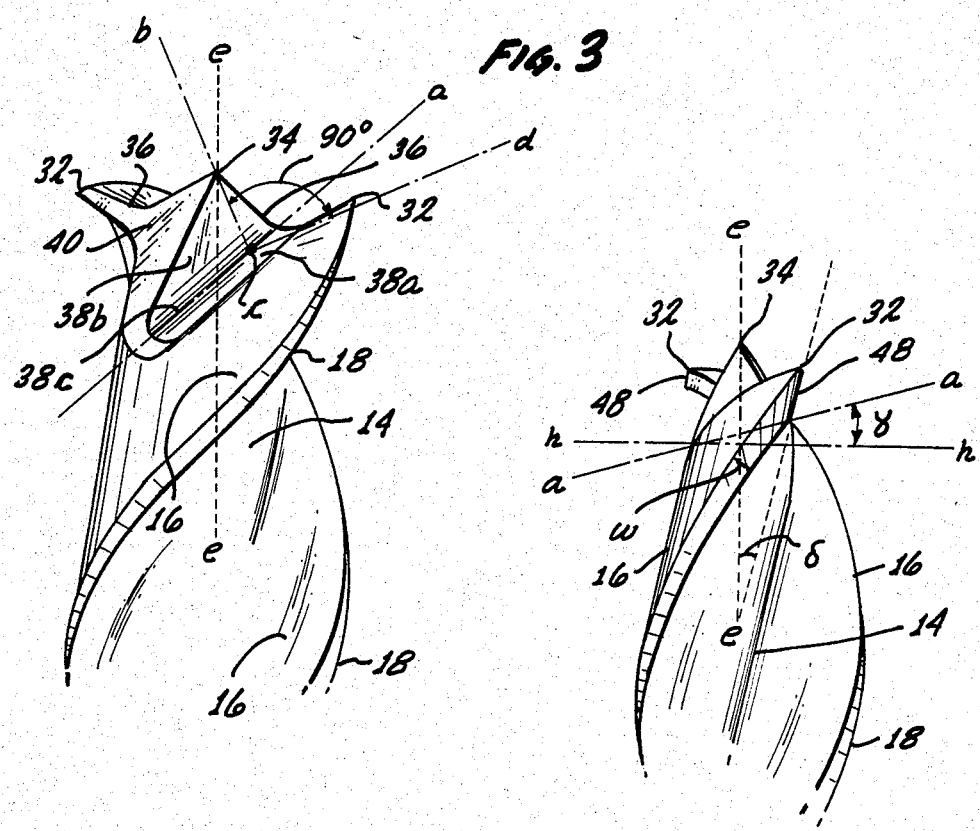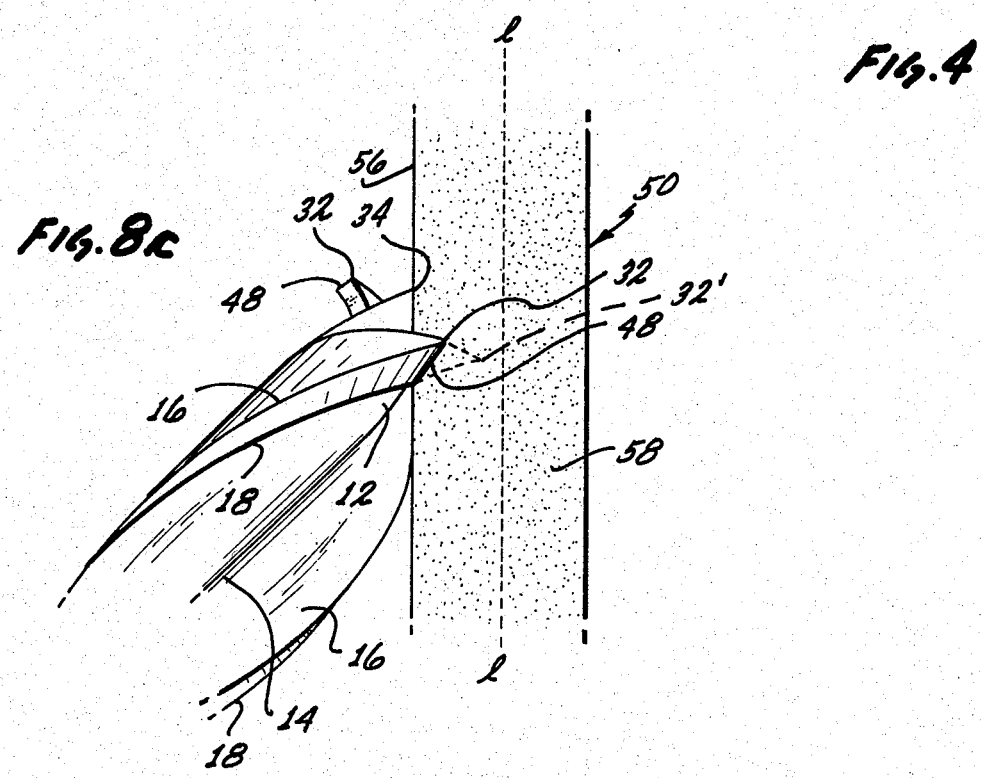

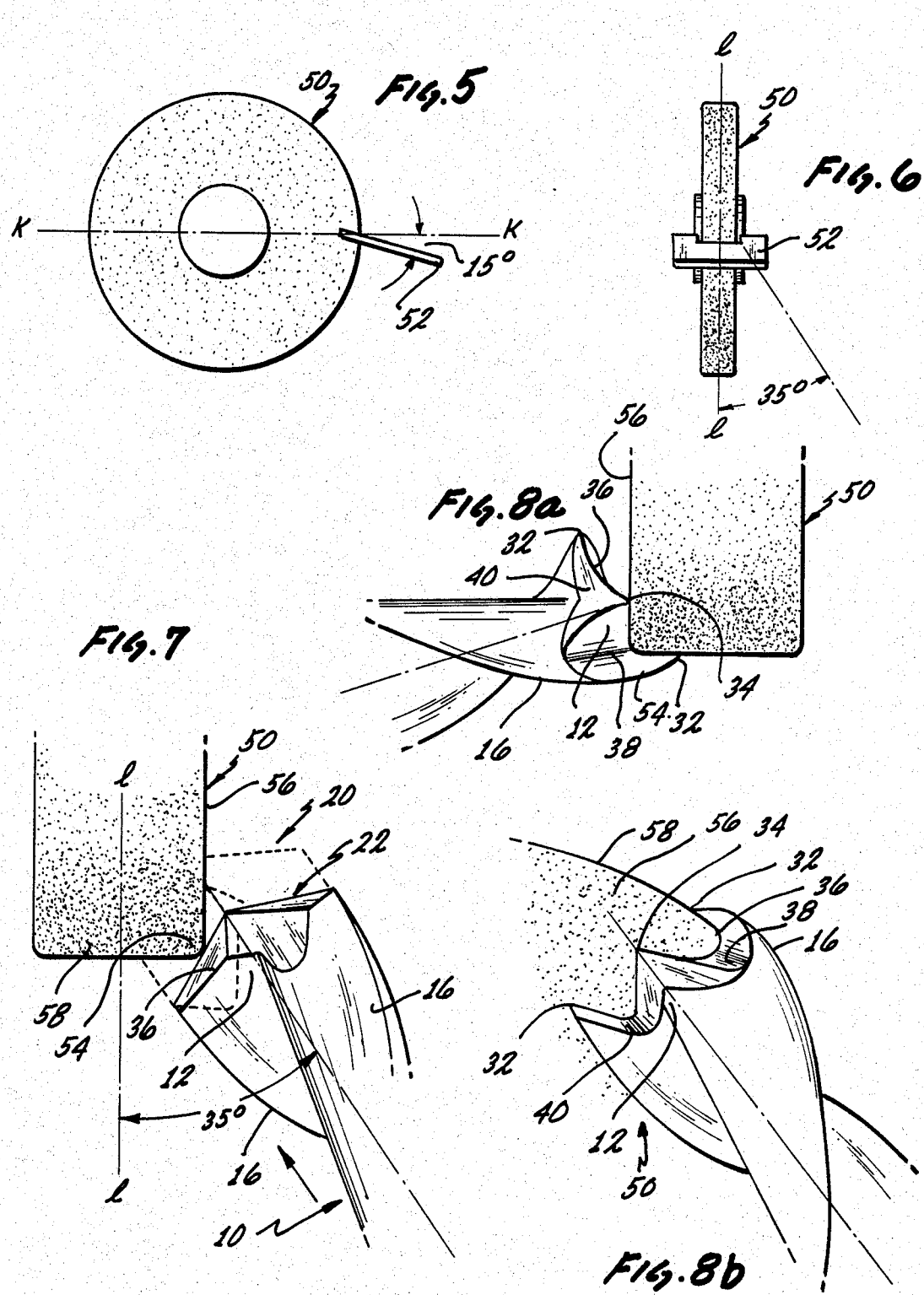

DRILL BIT FOR KEVLAR LAMINATES

BACKGROUND OF THE INVENTION

1. Field of the Invention

The present invention relates to drilling and milling bits and more particularly discloses a drill bit and method of making the same by converting the point of conventional drill bits to a point configuration better suited to drilling KEVLAR® fiber laminates and similar composite materials incorporating high strength fibers. (KEVLAR is a registered trademark of the DuPont Chemical Co.).

2. State of the Prior Art

The point of presently used drill bits is generally cone shaped and normally includes two cutting edges which slope rearwardly from a leading center point in a V shaped configuration. As the drill bit rotates and advances against the workpiece surface, initial contact is made at the center of the drill by the leading point. Material is, therefore, first removed from the center of the hole area such that the cutting action proceeds from the center outwardly towards the edge of the hole. There is, to some extent a wedging action as the drill point advances and a resultant tendency for material to be pushed radially outwardly by the drill point.

In a solid workpiece such as a block of metal, such cutting action is effective because the rigidity or resistance offered by the workpiece material to the advancing drill bit is generally the same at all points on the hole area; that is, the material last removed by the drill near the edge of the hole is still solidly affixed to the remainder of the workpiece body and yields to the cutting edge by separating from the workpiece.

The situation is different where laminates made of resin impregnated textile material, such as woven Kevlar fibers, are drilled. As the V shaped point of the drill advances into the fiber matrix, an ever increasing number of individual fibers are severed at the center of the hole, leaving free ends which are supported only by other adjacent fibers with which the severed fibers are interwoven. As the area of the hole increases as the drill advances into the textile, the number of such free ends increases rapidly. These free ends are relatively loosely supported within the fiber matrix and do not offer sufficient resistance to be severed by the cutting edges of the drill. Instead, the fiber ends at the edge of the hole yield to the V shaped cutting edge and are pushed outwardly, without being cut, to allow passage of the drill bit body. When the drill bit is withdrawn, the fiber ends return to their natural positions, extending into the freshly cut hole along its entire circumference. The result is that the effective diameter of the hole is somewhat smaller than that of the drill bit used and has a ragged edge with strangling filaments. Both the entry hole and exit hole of bores cut through Kevlar by standard drill bits are characterized by uncut lose filaments with rough bore hole surfaces. This phenomenon is known in the industry as "swelling" of the material. The bore hole is not cut to the dimension of the drill bit, but will always appear to be undersized or slightly smaller than the outer diameter of the drill bit. Such dimensional inaccuracies are undesirable, particularly in critical aerospace structures where Kevalar laminates and related composite materials find ever increasing application.

The known prior art includes so called spur bits which have a pair of radially outer points or spurs and edges connecting the points to a center spur of the drill bit. In particular, applicant is aware of drill bits sold under the mark Woodbits by the Leichtung Inc. Co., located at 4944 Commerce Parkway, 1079 PS Cleveland, Ohio 44128. These Woodbits are described as having a center spur that prevents skating of the bit, two cutting spurs that start and dimension a perfectly round hole, and extremely sharp flutes. These bits, however, are claimed to be designed specifically for wood, and further make use of conventional fluting rather than the parabolic flute preferred by the applicant for use with Kevlar and similar laminates. In addition, applicant's drill point configuration improves over the prior art in the curvature of the cutting edges which are designed to pull material radially inwardly as it is severed by the outer cutting points and further improve over the prior art in that the angle of the helix in the vicinity of the cutting point is reduced so as to avoid "grabbing" of the material and encourage a shearing action instead.

While the problem has been described in connection with the drilling of Kevlar, it is characteristic of many machining operations of fiber materials and fiber composites.

SUMMARY OF THE INVENTION

The problems encountered with the drill bits and other tools of the prior art have been overcome by the present invention which improves over drill bits of the prior art by providing a modified point configuration including particularly shaped cutting edges and cutting points. The drill bit construction, according to the present invention, is characterized by a sharp center point, a pair of outer cutting points and cutting edges extending therebetween. Typically, the drill bit is provided with two such arcuate cutting edges extending in diametrically opposed relationship from the center of the cylindrical drill bit body and terminating in diametrically opposed cutting points. The cutting edges as seen in an end view of the drill bit curve sharply backward from the outer cutting points in relation to the direction of rotation of the bit before curving towards the center of the bit. The radially outer cutting points may be somewhat shorter than the center point so that a center is established in the workpiece by the drill at first contact to avoid "skating" of the drill point, but without a significant amount of material being removed from the workpiece by the center point prior to contact of the radially outer cutting point with the workpiece surface. The resulting drill point thus includes a sharp center point which leads the drill bit into the workpiece and a pair of radially outer cutting points which lag slightly behind the center point in penetrating the workpiece.

The outer cutting points as seen in end view, i.e. in a plane transverse to the drill bit longitudinal axis point in the direction of normal rotation of the drill bit, so as to lead the cutting edges in that transverse plane as the drill bit rotates. The cutting points sever material in a clean circle at the very edge of the desired bore, and the severed material or chips are then drawn inwardly towards the center of the drill by the rearwardly curving portions of the cutting edges and into the flutes through which the material is withdrawn upwardly from the bore.

Each helix terminates at one of the sharp outer cutting points at the point end of the bit. The outer cutting points viewed in a plane perpendicular to the drill bit longitudinal axis extend in mutually opposite directions so as to point in the direction of normal rotation of the drill bit. The rake angle of the helix at the cutting points, as measured in relation to the drill axis is reduced by the grinding operation so as to substantially eliminate "grabbing" and lifting of material from the workpiece which results in uneven, ragged cutting action. The reduced helix angle allows the outer cutting points to shear the material as the drill rotates, rather than acting as a wedge which lifts the material away from the workpiece and, particularly when drilling textile laminate or fibre composition material, lifting fibre strands which then string out loosely from the edges of the hole without being severed from the workpiece.

The cutting edges curve back sharply from the outer cutting points both in a plane transverse to the drill axis as well as in a plane containing the drill axis and the two outer cutting points. Thus, all portions of the drill bit trail behind the outer cutting points, both during rotation of the drill and axial advance of the bit into the work, except for the slight axial lead of the center point. The center point, however, only affects a relatively small portion of the workpiece between and spaced from the outer cutting points. The lead of the center point does not significantly debilitate the fibre matrix near the circumference of the hole so as not to impair the shearing action of the outer cutting points.

It has been found that the modified point configuration is particularly effective in combination with parabolic flutes on the drill bit for best results in drilling of Kevlar laminates. The parabolic flute is a more gentle helical surface used to remove chips, known to the prior art and presently used, particularly in deep bore drilling bits. It has been observed, however, that the parabolic flutes are desirable for Kevlar material even where shallow holes are drilled.

A conventional drill bit with a conical type point can be modified by grinding, e.g. on a grinding wheel, and converted to the novel point configuration disclosed herein. The edge of the grinding wheel defined by the intersection of one flat side surface with the cylindrical peripheral surface of the wheel is used to cut into each of the radial cutting edges or lips on a conventional drill point to form the curved cutting edges extending between the center point and each outer cutting point.

The procedure for modifying a standard point drill, either a conventional twist drill or a parabolic flute drill, to the invented configuration includes the steps of aligning the longitudinal axis of the drill bit in relation to a grinding wheel in a manner to be described, aligning the chisel edge of the drill point parallel to the plane of the wheel, and grinding one of the original cutting edges until a first concavely curved surface is formed extending between a first sharp outer cutting point and the center point of the drill. The drill bit is then rotated 180 degrees about its longitudinal axis without altering its axial orientation relative to the grinding wheel and the opposite original cutting edge is ground in the same manner to thereby obtain a second concavely curved surface extending between a common raised center point and a second outer cutting point. The drill bit is then repositioned to bring the web (i.e. the center portion) of the drill bit against the wheel to grind a leading level surface which defines with the first concave surface a first arcuate cutting edge. At the same time the center of the drill point is shaped to a sharp center point and the rake angle of the helix near the outer cutting point is reduced by grinding. The segment of the helix edge of reduced rake angle is a leading edge of the outer cutting point. The drill is rotated again 180 degrees and the web is ground on the opposite side of the center point to form a second leading bevel surface intersecting with the second concavely curved surface to thus form the second arcuate cutting edge. Simultaneously, the center is brought to a sharp point and the rake angle of the second helix is reduced in the vicinity of the second outer cutting point. The chisel edge of the original drill point is reduced to a sharp center point as a result of the just described sequence, comprising four separate grinding operations. Each step contributes in the formation of one face of the center point, giving it a four sided pyramidal shape. Care must be taken to maintain the center point in alignment with the center axis of the drill during the grinding.

Many drill bit configurations have been tried for use with Kevlar laminates, but no completely satisfactory bit configuration has been found to this date, and the machining and clean drilling of Kevlar laminates remains a source of difficulty in the rapidly growing composite materials industry.

BRIEF DESCRIPTION OF THE DRAWINGS

FIG. 1 is a view in side elevation of a parabolic flute drill bit with a conventional point of the "split point" type.

FIG. 1a is a view in side elevation of the drill bit of FIG. 1 with the point modified according to the present invention.

FIG. 2 is an end view of the drill point of FIG. 1.

FIG. 2a is an end view of the drill point of FIG. 1a.

FIG. 3 is a perspective view of the modified drill bit of FIG. 1a rotated about its longitudinal axis approximately 45 degrees counterclockwise (clock viewed as in FIG. 2a) from the view shown in FIG. 1a and with its longitudinal axis tilted approximately 45 degrees towards the viewer.

FIG. 4 shows the drill bit of FIG. 3 rotated approximately an additional 35 degrees counterclockwise.

FIG. 5 is a side elevation view of a grinding wheel illustrating the positioning of the drill bit axis for converting a conventionally tipped drill bit according to this invention.

FIG. 6 is an edge view of a grinding wheel further illustrating the positioning of the drill bit axis relative to the grinding wheel for effecting the conversion according to the present method.

FIG. 7 illustrates the grinding away of an original cutting edge to form a concavely curved surface and a corresponding outer cutting point on a conventional drill bit positioned according to FIGS. 5 and 6 relative to the grinding wheel.

FIG. 8a shows in plan view the positioning of the drill bit for forming one of the new cutting edges while simultaneously sharpening the center point and reducing the rake angle of the helix.

FIG. 8b further illustrates in side elevation the positioning of the drill bit against the grinding wheel during the operation shown in FIG. 8a.

FIG. 8c is a front elevational view further illustrating the positioning of the drill bit during the operation of FIGS. 8a and 8b, particularly showing the reduction of the rake angle of the helix at the outer cutting point.

DETAILED DESCRIPTION OF A PREFERRED EMBODIMENT OF THE INVENTION

A conventional drill bit 10 is shown in FIGS. 1 and 2 and comprises a pair of helices 16 joined by a central web portion 12. Between the helices 16 are defined parabolic flutes 14 through which are extracted chips of the workpiece material during drilling. Each helix 16 is beveled to define a helical cutting edge 18. The particular drill point shown is of the so called "split point" type commonly used with parabolic flute drill bits. The generally conical point 20 of the drill bit comprises a pair of radial cutting edges or lips 22 meeting in a leading center point 24.

The configuration of the conventional conical drill point 20 is better appreciated by reference to FIG. 2 in which the normal counterclockwise direction of rotation of the drill bit is indicated by the arrow. The cutting edges 22 of the split point drill are each split or broken into a radially outer segment 22a and a radially inner segment 22b. The inner edge segments 22b lie along a common straight line which passes through the center 24 of the point in the end view of FIG. 2. The drill point further comprises lip relief surfaces 26 which trail behind the cutting edges or lips 22. The lip relief surfaces 26 terminate in trailing edges 28 which are each defined by the intersection of the lip relief surface 26 with a more steeply inclined rear bevel surface 30.

While certain conventional drill points, such as the "split point" drills do not have a true chisel edge, for purposes of this specification, and particularly for purposes of alignment of the drill bit with a grinding wheel, the two inner segments 22b of the cutting edges, taken together, will be considered equivalent to a chisel edge.

The drill bit 10a converted according to the present invention, shown in FIGS. 1a, 2a, 3 and 4 is seen to retain the parabolic flutes 14 and helical edges 18. The drill point, however, has been altered from the original conical shape suggested in dotted lines in FIG. 1a to the solid lined and shaded configuration.

The converted point includes a pair of radially outer cutting points 32, a center 34 which is preferably slightly higher than the outer cutting points 32, and a pair of concavely curved cutting edges or lips 36 extending from the center point 34 towards a corresponding one of the cutting points 32. New concave lip relief surfaces 38 have been shaped to conform to the concave curvature of the new cutting edges 36. The lip relief surfaces 38 include two intersecting plane surfaces 38a and 38b which are preferably mutually perpendicular and joined by a curved surface 38c. Each cutting edge 36 also includes a pair of substantially straight segments 36a and 36b joined by a curved concave middle portion 36c.

The modified drill point of FIG. 2a also comprises a pair of leading bevel surfaces 40 which intersect with the concave lip relief surfaces 38 to define the sharp cutting edges 36. The bevel surfaces 40 begin at the outer cutting points, follow the curvature of the cutting edges and extend beyond the center point 40 to intersect with the opposite lip relief surface 38 to define the trailing edges 42. The radially inner portions of the trailing edges 42 lie along a common straight line extending through the center 34 of the drill point, as best appreciated in FIG. 2a.

As shown in the end view of FIG. 2a the radially outer cutting points 32 point in the direction of normal rotation of the drill bit indicated by the arrow. The outer segments 36a of the cutting edges 36 sweep sharply rearwardly from the direction of rotational advance of the points such that the cutting points 32 lead other portions of the drill in a plane perpendicular to the drill bit longitudinal axis during normal counterclockwise rotation of the drill bit.

As best seen in the end view of FIG. 2a, each cutting edge 36 curves back from the outer cutting point 32 at a relatively sharp initial angle beta ($\beta$) measured relative to the tangent line t—t in a plane transverse to the drill bit longitudinal axis. The angle beta is preferably less than 65 degrees. After curving back to define the concavities 44 the cutting edges then become more closely straight radial lines as they approach the center 34. Conventional cutting edges are more closely perpendicular to a tangent line such as t—t, as in the original drill point of FIG. 2, such that material is pushed radially outwardly towards the circumference of the bore by the outer edge segment 22a, rather than being quickly drawn inwardly as in the modified point of FIG. 2a.

The configuration of the outer cutting points 32 and cutting edges 36 causes the material from the workpiece to be severed cleanly at the edge of the bore and pulled into the concavity 44 defined by the cutting edge 36 and bevel surface 40 inwardly towards the center of the bore, even as it is being cut by the rotating drill bit, and then extracted from the bore through the flutes 14. The outer segments 36a of the cutting edges also recede from the cutting points 32 in an axial direction as best seen in FIG. 1a such that the points 32 project forwardly during axial advance of the drill bit. No outwardly directed force is exerted on the workpiece material at the perimeter of the bore because the lateral surfaces 35 of the cutting points 32 curve back smoothly and recede into the flutes 14.

In addition, the rake angle of the helix edge 18 is reduced near the cutting points 32 to a relatively small angle delta ($\delta$) measured with respect to the longitudinal axis of the drill bit as indicated in FIG. 4. The clean and efficient cutting of the laminate material is aided by the reduced helix angle near the cutting points 32. If the helix angle is not reduced, as in dotted lines in FIG. 8c, then as the point 32 begins to penetrate the workpiece the original steep angle omega ($\omega$) of the helix edge 18 in FIG. 4 will encourage fibres to ride up along the helix edge and tend to lift or grap material from the workpiece and pull it up. Thus, in the preferred manner of practicing the invention, the helix angle is reduced in order to inhibit such grabbing action and encourage clean shearing of the laminate and fibers embedded therein, and allow the severed material to be readily drawn inwardly by the afore described concavely shaped cutting edges and surfaces towards the interior of the bore. The grabbing effect of the original unmodified helix would interfere with the desired efficient movement of the severed material towards the interior of the bore and its extraction through the flutes.

FIGS. 5 through 8c of the drawings illustrate a sequence of steps for modifying a conventional drill point to the novel configuration disclosed herein. The procedure involves the use of a conventional grinding wheel of an appropriate abrasive material selected for grinding the particular drill bit metal. As shown in FIG. 5 the drill bit is held at a 15 degree angle relative to a horizontal diameter k—k of the grinding wheel 50 in the plane of the wheel, preferably with the aid of a tool holder 52 and simultaneously held at a 35 degree angle relative to the vertical plane 1—1 of the wheel as shown in FIG. 6. The drill bit is further positioned such that the edges 22b shown in FIG. 2 are aligned in parallel with the plane 1—1 of the wheel while the longitudinal axis of the drill bit is maintained at the angles indicated in FIGS. 5 and 6.

The drill bit is then fed against the grinding wheel along its longitudinal axis as indicated by the arrow in FIG. 7, while maintaining the prescribed angles relative to the wheel 50, such that the edge 54 of the wheel grinds into the approximate center of one of the original cutting edges 22 of the drill point 20. The grinding wheel will normally have a substantially planar side surface 56 and a generally cylindrical peripheral or front surface 58 which intersects the side surface 50 to define a grinding edge 54. This edge normally has a small radius of curvature and is not rigorously angular and thus forms the curved portions 36c and 38c of the cutting edges 36 and lip relief surfaces 38 respectively of the modified point. The drill bit 10 is fed to the grinding wheel until the original cutting edge 22 is ground away to the shape 36 indicated in dotted lines in FIG. 7, to form a first outer cutting point 32 at the end of one helix 16 and a concave lip relief surface 38 extending between the center 34 and the newly formed outer point 32. The drill bit is then rotated 180 degrees about its longitudinal axis without changing its axial relationship with respect to the grinding wheel and the grinding operation is repeated on the opposite cutting edge 22 so as to form a second concave lip relief surface 38 and a second outer cutting point 32.

The drill bit is then removed from the tool holder 52 and applied against the grinding wheel 50 in the manner indicated in FIGS. 8a, 8b, and 8c. The purpose of this step is threefold: sharpening of the center point 34, grinding of the lip bevels 40 to form and sharpen the cutting edges 36, and reduction of the helix rake angle.

During this step, the drill bit generally is positioned to the side of the grinding wheel and at a relatively shallow angle to the plane of the wheel, so as to bring web portion 12 including the point 34 of the drill against the side 56 of wheel without damaging any portion of the flutes or lower portions of the drill bit, and with the end portion of one helix 16 curling over the edge 54 such that the cutting point 32 lies against the front surface 58 of the wheel. The center point 34 of the drill will thus lie against the side 56 of the wheel while the outer point 32 lies against the front surface 58 of the grinding wheel. The edge 54 of the grinding wheel thus cuts in between the center point and the outer cutting point 36 of the drill point to form a leading bevel surface 40 which intersects with one of the previously formed relief surfaces 38 to define a new, arcuate cutting edge 36. The drill bit is then rotated 180 degrees about its longitudinal axis and the operation is repeated to form the second bevel surface 40, reduce the angle of the second helix near its cutting point 36 of the pyramidal center point 34. The second bevel surface intersects with the other previously formed relief surface 38 to define the second new arcuate cutting edge 36. The reduction of the helix rake angle is best appreciated from FIG. 8c where the ground off portion of the outer cutting points is shown in dotted lines. The edge segment 48 is adjacent to the outer cutting point 36 and is a leading edge during normal rotation of the drill bit. The segment 48 of the helix edge is at a reduced angle delta ($\delta$) relative to the longitudinal axis e—e of the drill bit as shown in FIG. 4 which angle is less than 25 degrees, but preferably between 4 and 15 degrees approximately. The normal rake angle of the helix, prior to grinding of the point in FIG. 8c as shown by the extending dotted line terminating at point 32', is at a considerably steeper angle relative to the longitudinal axis of the drill bit. It is readily appreciated that the steep slope of the unreduced helix edge 18 would tend to cause loosely supported fibres to ride upwardly along this edge once the point 32' had penetrated the workpiece surface. As modified, the segment 48 is closer to being parallel to the drill bit axis and has the effect of shearing across the fibre matrix, without allowing the cutting point 36 to get under the fibres and lift them up along the helix edge, which would result in a more ragged cut.

The geometry of the modified drill point may be more completely understood by reference to FIGS. 1a, 2a, 3 and 4 where some of the principal angular relationships are indicated. The surfaces 38a and 38b of each lip relief surface 38 are approximately perpendicular to each other as indicated by angle b-c-d in FIG. 3. This relationship is a result of the perpendicular relationship of the side surface 56 and the front cylindrical surface 58 of the grinding wheel, which form these two surfaces. The line a—a in FIGS. 2a, 3 and 4 along which the surfaces 38a and 38b intersect is approximately parallel to the original drill point edges 22b shown in FIG. 2 prior to grinding off. This is because the edges 22b are aligned with the plane 1—1 (shown in FIG. 6) of the grinding wheel such that the edge 54 of the grinding wheel cuts along the line a—a of the lip relief surface 38. While the line a—a is shown to be substantially straight in FIG. 3, some concavity will in actually exist along that line due to the curvature of the edge 54 of the grinding wheel 50. This curvature will normally be slight since the diameter of the grinding wheel is preferably selected to be large in comparison to the dimensions of the drill point.

The radially outer segment 36a of the modified cutting edge 36 viewed in elevation, as in FIGS. 1a and 3, also lie at a sharp angle relative to the longitudinal axis of the drill bit. The segment 36a of the modified cutting edge forms an angle alpha ($\alpha$) with a line parallel to the longitudinal axis of the drill bit as indicated in FIG. 1a. The angle gamma will turn out to be approximately 35 degrees if the drill bit is positioned as indicated in FIGS. 5 and 6 relative to the grinding wheel during the modification procedure. The angle gamma ($\gamma$) formed by the lip relief surfaces 38 as measured in FIG. 4 between the line a—a and a line h—h perpendicular to the longitudinal axis e—e of the drill bit may be approximately 15 degrees. This figure is not critical, however, and a smaller lip relief angle may be desirable in that it has the effect of prolonging the life of the cutting edges 36 of the modified drill point.

Some variation in these angular relationships may be expected due to various variables including wear on the grinding wheel which causes the grinding edge of deviate from the rectangular relationship between the side and front cylindrical surfaces, particularly during long production runs. However, if a fresh grinding wheel with side faces which are square relative to the cylindrical surface of the wheel is employed then the resulting configuration of the modified drill point will more closely conform to the values given herein. It will be understood that the modification of the conventional drill bit may be done by manually holding the drill bit on the tool holder against the grinding wheel and some variations in the final shape of the point may result. The invention is, therefore, not limited to a very close set of dimensional and angular tolerances. If a high degree of uniformity is desired, the grinding operation should be carried out with the aid of carefully positioned jigs, although acceptable results have been obtained by hand-holding the drill bits against a tool holder 52 such as shown in FIG. 5 during the initial grinding of the original cutting edges and holding the drill entirely by hand against the grinding wheel during the final steps illustrated in FIGS. 8a through 8c.

While the foregoing procedure for modifying a conventional drill bit has been with reference to a parabolic flute drill bit, the same procedure may be carried out with a conventionally fluted drill bit, although the parabolic fluted type has been found preferable for working the Kevlar laminate material. The modification of a conventional drill point having a true chisel edge is essentially the same as that described for the split point parabolic flute drill bit of FIGS. 1 and 2. The drill point, however, is aligned such that is chisel edge is parallel to the vertical plane 1—1 of the grinding wheel as was done with the edges 22b in the case of the split point drill bit in FIG. 2. The relationship of the drill bit axis to the grinding wheel is otherwise unchanged.

It must be understood that various alterations and modifications may be made by those having ordinary skill in the art to both the structure and method of fabrication of the present invention without departing from the spirit and scope of the invention. Therefore, the presently illustrated embodiment has been shown only by way of example and for the purposes of clarity and should not be taken to limit the scope of the following claims.

I claim:

1. An improved drill bit for drilling Kevlar laminates or the like, said drill bit having a pair of helical leading edges such terminating in an outer cutting point; a center point; and concavely curved cutting edges extending between said center point and each said outer cutting point, said cutting edges curving back sharply from said cutting points as viewed along the longitudinal drill bit axis and in a direction opposite to normal rotation of said drill bit so as to draw material severed by said cutting points radially inwardly from the edge of a bore, said helical leading edges having a reduced rake angle along a leading edge segment adjacent to said cutting points relative to the rake angle of said leading edges along portions removed from said outer cutting points to thereby increase the shearing effect of said edges and minimize lifting of workpiece material by said leading edges.

2. The drill bit of claim 1 wherein each of said cutting edge in the immediate vicinity of said outer cutting point forms an angle of less than 65 degrees with a line tangent to the drill bit circumference at said outer cutting point.

3. The drill bit of claim 1, wherein said reduced rake angle is less than 25 degrees relative to the longitudinal axis of the drill bit.

4. The drill bit of claim 1, wherein said reduced rake angle is between 4 degrees and 15 degrees relative to the longitudinal axis of the drill bit.

5. The drill bit of claim 1, wherein said outer cutting points extend in the direction of rotation of said drill bit and lead said cutting edges in a plane transverse to the drill bit longitudinal axis.

6. The drill bit of claim 5, wherein said segments of reduced rake angle are leading edges of said outer cutting points.

7. The drill bit of claim 1, further comprising parabolic flutes defined between said helical edges.

8. The drill bit of claim 1, wherein said center point is slightly higher than said outer cutting points in an axial direction.

9. The drill bit of claim 1, wherein said cutting edges also recede from said outer cutting points in an axial direction.

* * * * *